(12) United States Patent
Carmel et al.

(10) Patent No.: US 9,658,917 B2
(45) Date of Patent: May 23, 2017

(54) SERVER PERFORMANCE CORRECTION USING REMOTE SERVER ACTIONS

(71) Applicant: AppDynamics, Inc., San Francisco, CA (US)

(72) Inventors: Ido Carmel, San Francisco, CA (US); Abhijit Sawant, San Francisco, CA (US); Raghvendra Singh, San Francisco, CA (US); Takashi Arai, San Francisco, CA (US); Andrew Morgan, San Francisco, CA (US); Bhaskar Sunkara, San Francisco, CA (US)

(73) Assignee: AppDynamics, Inc., San Francisco, CA (US)

( * ) Notice: Subject to any disclaimer, the term of this patent is extended or adjusted under 35 U.S.C. 154(b) by 0 days.

(21) Appl. No.: 14/175,945

(22) Filed: Feb. 7, 2014

(65) Prior Publication Data
US 2015/0227412 A1    Aug. 13, 2015

(51) Int. Cl.
*G06F 11/00*    (2006.01)
*G06F 11/07*    (2006.01)
(Continued)

(52) U.S. Cl.
CPC ...... *G06F 11/0793* (2013.01); *G06F 11/0709* (2013.01); *G06F 11/079* (2013.01);
(Continued)

(58) Field of Classification Search
CPC ............. G06F 11/0709; G06F 11/0754; G06F 11/0757; G06F 11/076; G06F 11/079;
(Continued)

(56) References Cited

U.S. PATENT DOCUMENTS 6,163,853 A * 12/2000 Findlay ............... G06F 11/0709
714/4.4
6,304,905 B1 * 10/2001 Clark .......................... 709/224
(Continued)

FOREIGN PATENT DOCUMENTS

GB    2 518 052    3/2015

OTHER PUBLICATIONS

U.S. Appl. No. 14/018,355, filed Sep. 4, 2013, Ido Carmel, Group Server Performance Via Actions to Server Subset.

*Primary Examiner* — Gabriel Chu
(74) *Attorney, Agent, or Firm* — Bachmann Law Group (57) ABSTRACT

Business transactions and the nodes processing the transactions may be monitored. Actions may be applied to one or more nodes when a performance issue is detected. A performance issue may relate to a metric associated with a transaction or node that processes the transaction. If a performance metric does not satisfy a health rule, the policy determines which action should be performed to correct the performance of the node. The corrective action may be applied to a node other than the node at which the performance metric is associated with. For example, if a performance metric for a first node does not satisfy a threshold, the corrective action may be applied to a second node. When a solution applied to a second node is found to correct the problem in first node, the solution may be applied to the other nodes experiencing the same problem.

30 Claims, 6 Drawing Sheets

(51) Int. Cl.
*H04L 29/08* (2006.01)
*G06F 11/34* (2006.01)

(52) U.S. Cl.
CPC ...... *G06F 11/0748* (2013.01); *G06F 11/3409* (2013.01); *H04L 67/02* (2013.01); *H04L 67/22* (2013.01); *G06F 11/3495* (2013.01); *G06F 2201/815* (2013.01); *G06F 2201/87* (2013.01)

(58) Field of Classification Search
CPC ............... G06F 11/0793; G06F 11/202; G06F 11/2023; G06F 11/2025; G06F 11/228; G06F 11/2033; G06F 11/2035; G06F 11/2041; H04L 67/1002; H04L 67/1004; H04L 67/1008; H04L 67/101; H04L 67/1012; H04L 67/1023; H04L 67/1029; H04L 67/1031; H04L 67/1034; H04L 69/40
See application file for complete search history.

(56) References Cited

U.S. PATENT DOCUMENTS

| | | | | |
|---|---|---|---|---|
| 6,757,118 | B1* | 6/2004 | Walker et al. | 360/31 |
| 8,862,947 | B1* | 10/2014 | Gray et al. | 714/47.2 |
| 2002/0065922 | A1* | 5/2002 | Shastri | 709/227 |
| 2006/0195561 | A1* | 8/2006 | Keane | H04L 41/5012 709/223 |
| 2008/0062863 | A1* | 3/2008 | Ginde | 370/221 |
| 2008/0222154 | A1* | 9/2008 | Harrington et al. | 707/10 |
| 2009/0300430 | A1* | 12/2009 | Nissan-Messing et al. | 714/48 |
| 2010/0046546 | A1* | 2/2010 | Ram et al. | 370/468 |
| 2012/0303670 | A1* | 11/2012 | Gillen et al. | 707/797 |
| 2013/0111467 | A1* | 5/2013 | Sundararaj | 717/176 |
| 2014/0082417 | A1* | 3/2014 | Barton et al. | 714/26 |
| 2015/0067147 | A1 | 3/2015 | Carmel | |
| 2015/0134831 | A1* | 5/2015 | Hiroishi | 709/226 |

* cited by examiner

SERVER PERFORMANCE CORRECTION USING REMOTE SERVER ACTIONS

BACKGROUND OF THE INVENTION

The World Wide Web has expanded to provide web services faster to consumers. Web services may be provided by a web application which uses one or more services to handle a transaction. The applications may be distributed over several machines, making the topology of the machines that provides the service more difficult to track and monitor.

Monitoring a web application helps to provide insight regarding bottle necks in communication, communication failures and other information regarding performance of the services that provide the web application. When most systems detect a problem with a particular machine, they attempt to fix the problem at that particular machine. In many cases involving a complicated distributed transaction, however, the problem with a machine may not be completely fixed by restarting or applying some other fix to the machine at which the problem is detected.

There is a need in the art for an improved method for remedying an error at a machine which processes a distributed transaction.

SUMMARY OF THE CLAIMED INVENTION

The present technology may monitor business transactions and the nodes processing the transactions. Actions may be applied to one or more nodes when a performance issue is detected. A performance issue may relate to a metric associated with a transaction or node that processes the transaction. If a performance metric determined from data captured by monitoring does not satisfy a health rule, the policy determines which action should be performed to correct the performance of the node. The corrective action may be applied to a node other than the node at which the performance metric is associated with. For example, if a performance metric for a first node does not satisfy a threshold, the corrective action may be applied to a second node. When a solution applied to a second node is found to correct the problem in first node, the solution may be applied to the other nodes experiencing the same problem.

An embodiment may include a method for monitoring a business transaction. A determination may be made that a performance data value associated with a first node of a distributed server system do not satisfy a threshold. A second node of the distributed server system may be selected at which to apply a first corrective action based on the performance data value associated with the first node. The first corrective action may be applied to the second node.

An embodiment may include a system for monitoring a business transaction. The system may include a processor, a memory and one or more modules stored in memory and executable by the processor. When executed, the one or more modules may determine that a performance data value associated with a first node of a distributed server system do not satisfy a threshold, select a second node of the distributed server system at which to apply a first corrective action based on the performance data value associated with the first node, and apply the first corrective action to the second node.

DETAILED DESCRIPTION

Business transactions involving multiple nodes are monitored and actions are applied to a node other than the node at which a performance issue is detected. A performance issue may relate to a performance data value, such as a metric associated with a transaction or node that processes the transaction, an error, or other value. When a problem is detected for a first node, the present technology may address a second node rather than apply an action to the first node which experiences the problem. When a solution is found to correct the problem, the solution may be subsequently applied to the other nodes experiencing the same problem.

Applications are monitored by a combination of agents and one or more controllers. A controller may receive data captured and transmitted to the controller by one or more agents located on each of several distributed application servers. The controller may include a set of health rules, policies, and actions. If a performance metric determined from the captured data does not satisfy a health rule, the policy determines which action should be performed to correct the performance of the node. A node may include any entity that runs software which is relevant to an application being monitored. A node may be a server, a virtual machine, or other entity. A cluster is a group of nodes relating to a singular purpose or function, such as for example a group of servers that process a particular web service request (e.g., a "check-out" function on an ecommerce site). Actions may be applied to a node that processes a distributed application other than the node from which data is captured and for which the captured data does not satisfy a health rule.

Actions may be applied by agents located at or in communication with the node. There may be one or more types of agents residing on an application server which may apply an action. A machine agent may reside on a server, may monitor basic hardware and software metrics, and may perform basic instructions to the server. Examples of measurements taken by a machine agent include memory usage, processor usage, and other metrics. Other agents may include a java agent or a PHP agent, each of which may be utilized to collect data, instrument code at the application server on which they are installed, execute business logic, and other functionality.

Figure 1:
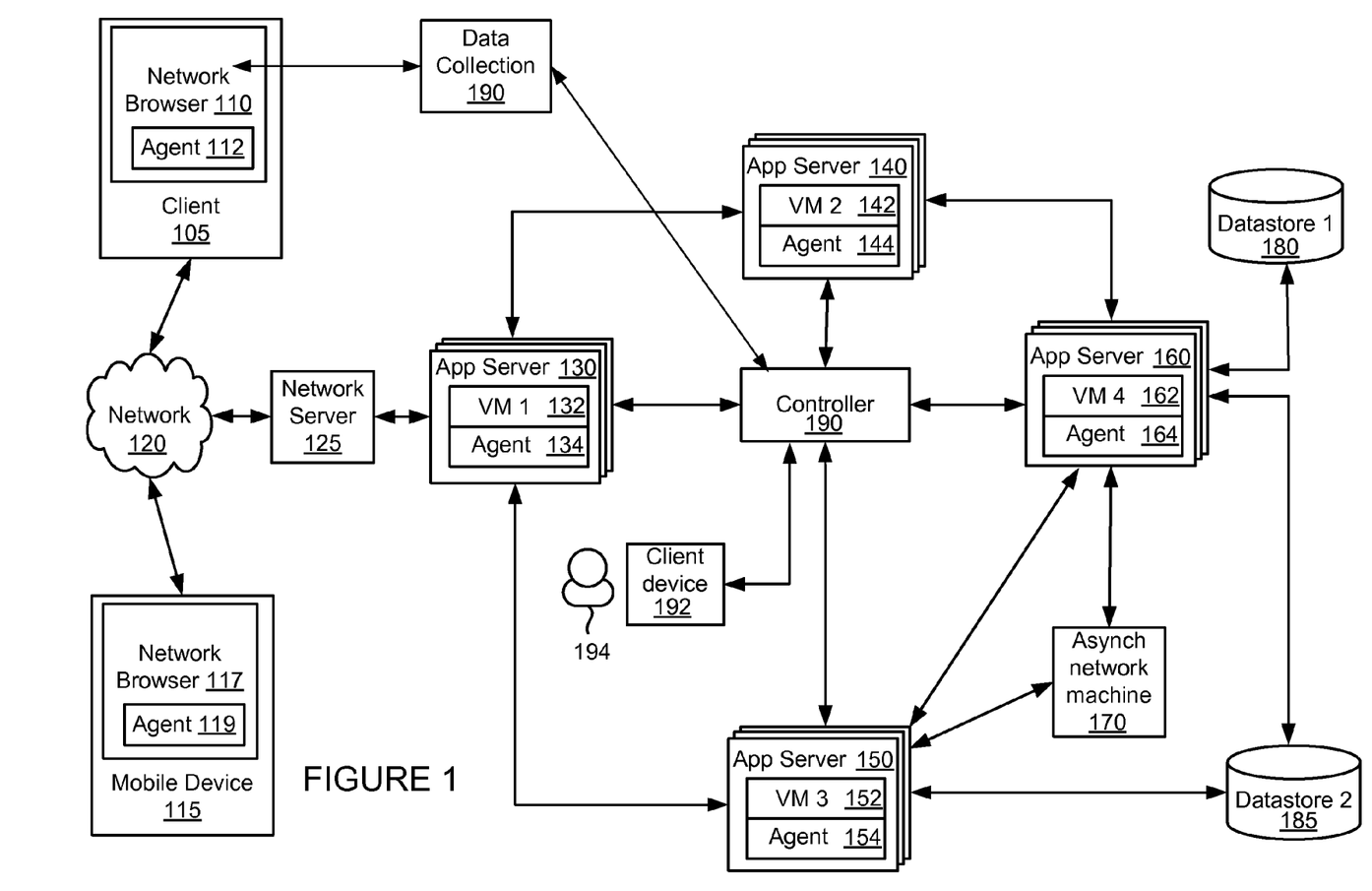
FIG. 1 is a system for monitoring and managing application performance.

The present technology may monitor applications and nodes and apply actions to nodes as needed within the system for monitoring business transactions. FIG. 1 is an exemplary system for monitoring business transactions. System 100 of FIG. 1 includes client devices 105 and 192, mobile device 115, network 120, network server 125, application servers 130, 140, 150 and 160, asynchronous network machine 170, data stores 180 and 185, controller 190, and data collection server 195.

Client device 105 may include network browser 110 and be implemented as a computing device, such as for example a laptop, desktop, workstation, or some other computing device. Network browser 110 may be a client application for viewing content provided by an application server, such as application server 130 via network server 125 over network 120.

Network browser 110 may include agent 112. Agent 112 may be embedded, installed or otherwise provided on network browser 110 and/or client 105, for example as a network browser add-on, downloading the agent to the network browser as part of HTML, or in some other manner. Agent 112 may be executed to monitor network browser 110, the operation system of client 105, and any other application, API, or other component of client 105. Agent 112 may determine network browser navigation timing metrics, access browser cookies, and transmit data to data collection 160, controller 190, or another device. Agent 112 may perform other operations related to monitoring a request at client 105 as discussed herein.

Mobile device 115 is connected to network 120 and may be implemented as a portable device suitable for receiving content over a network, such as for example a mobile phone, smart phone, or other portable device. Both client device 105 and mobile device 115 may include hardware and/or software configured to access a web service provided by network server 125.

Mobile device 115 may include network browser 117 and an agent 119. Agent 119 may reside in and/or communicate with network browser 117, as well as communicate with other applications, an operating system, APIs and other hardware and software on mobile device 115. Agent 119 may have similar functionality as that described herein for agent 112 on client 105, and may repot data to data collection server 160 and/or controller 190.

Network 120 may facilitate communication of data between different servers, devices and machines. The network may be implemented as a private network, public network, intranet, the Internet, a Wi-Fi network, cellular network, or a combination of these networks.

Network server 125 is connected to network 120 and may receive and process requests received over network 120. Network server 125 may be implemented as one or more servers implementing a network service. When network 120 is the Internet, network server 125 may be implemented as a web server. Network server 125 and application server 130 may be implemented on separate servers and machines or the same server and/or machine.

Application server 130 may communicate with every device, server and machine illustrated in FIG. 1 (some connections not shown in FIG. 1), as well as other machines that may or may not be implemented in a network based service. For example, application server may communicate with network server 125, application servers 140-160, controller 190, clients 105, 115 and 192, and data stores 180-185. Application server 130 may also communicate with other machines and devices (not illustrated in FIG. 1). Application server 130 may host an application or portions of a distributed application and include a virtual machine 132, agent 134, and other software modules. Application server 130 may be implemented as one server or multiple servers as illustrated in FIG. 1.

Virtual machine 132 may be implemented by code running on one or more application servers. The code may implement computer programs, modules and data structures to implement a virtual machine mode for executing programs and applications. In some embodiments, more than one virtual machine 132 may execute on an application server 130. A virtual machine may be implemented as a Java Virtual Machine (JVM). Virtual machine 132 may perform all or a portion of a business transaction performed by application servers comprising system 100. A virtual machine may be considered one of several services that implement a web service.

Virtual machine 132 may be instrumented using byte code insertion, or byte code instrumentation, to modify the object code of the virtual machine. The instrumented object code may include code used to detect calls received by virtual machine 132, calls sent by virtual machine 132, and communicate with agent 134 during execution of an application on virtual machine 132. Alternatively, other code may be byte code instrumented, such as code comprising an application which executes within virtual machine 132 or an application which may be executed on application server 130 and outside virtual machine 132.

In embodiments, applications may execute on servers in program containers other than a virtual machine. For example, applications may be executed in PHP on any of servers 130-160.

Agent 134 on application server 130 may be installed on application server 130 by instrumentation of object code, downloading the application to the server, or in some other manner. Agent 134 may be executed to monitor application server 130, monitor virtual machine 132, and communicate with byte instrumented code on application server 130, virtual machine 132 or another application on application server 130. Agent 134 may detect operations such as receiving calls and sending requests by application server 130 and virtual machine 132. Agent 134 may receive data from instrumented code of the virtual machine 132, process the data and transmit the data to controller 190. Agent 134 may perform other operations related to monitoring virtual machine 132 and application server 130 as discussed herein. For example, agent 134 may identify other applications, share business transaction data, aggregate detected runtime data, and other operations.

Information regarding collecting data for analysis is discussed in U.S. patent application Ser. No. 12/878,919, titled "Monitoring Distributed Web Application Transactions," filed on Sep. 9, 2010, U.S. patent application Ser. No. 13/189,360, titled "Automatic Capture of Diagnostic Data Based on Transaction Behavior Learning," filed on Jul. 22, 2011, and U.S. patent application Ser. No. 13/365,171, titled "Automatic Capture of Detailed Analysis Information for Web Application Outliers with Very Low Overhead," filed on Feb. 2, 2012, the disclosures of which are incorporated herein by reference.

Each of application servers 140, 150 and 160 may include an application and an agent. Each application may run on the corresponding application server or a virtual machine. Each of virtual machines 142, 152 and 162 on application servers 140-160 may operate similarly to virtual machine 132 and host one or more applications which perform at least a portion of a distributed business transaction. Agents 144, 154 and 164 may monitor the virtual machines 142-162, collect and process data at runtime of the virtual machines, and communicate with controller 190. The virtual machines 132, 142, 152 and 162 may communicate with each other as part of performing a distributed transaction. In particular each virtual machine may call any application or method of another virtual machine.

Asynchronous network machine 170 may engage in asynchronous communications with one or more application servers, such as application server 150 and 160. For example, application server 150 may transmit several calls or messages to an asynchronous network machine. Rather than communicate back to application server 150, the asynchronous network machine may process the messages and eventually provide a response, such as a processed message, to application server 160. Because there is no return message from the asynchronous network machine to application server 150, the communications between them are asynchronous.

Data stores 180 and 185 may each be accessed by application servers such as application server 150. Data store 185 may also be accessed by application server 150. Each of data stores 180 and 185 may store data, process data, and return queries received from an application server. Each of data stores 180 and 185 may or may not include an agent.

Controller 190 may control and manage monitoring of business transactions distributed over application servers 130-160. In some embodiments, controller 190 may receive runtime data, including data associated with monitoring client requests at client 105 and mobile device 115, from data collection server 160. In some embodiments, controller 190 may receive runtime data from each of agents 112, 119, 134, 144 and 154. Controller 190 may associate portions of business transaction data with other portions of business transaction data and virtual machines, applications, and other nodes and hardware that the business transaction data is generated from monitoring, communicate with agents to configure collection of runtime data, and provide performance data and reporting through an interface. Performance data may include metrics, errors, and other data and events which may be captured and/or generated during the monitoring of a distributed transaction. The interface may be viewed as a web-based interface viewable by client device 192, which may be a mobile device, client device, or any other platform for viewing an interface provided by controller 190. In some embodiments, a client device 192 may directly communicate with controller 190 to view an interface for monitoring data.

Controller 190 may also correlate request metrics with business transaction data received from client 105 and mobile device 115 and from application servers 130-150, respectively.

Figure 2:
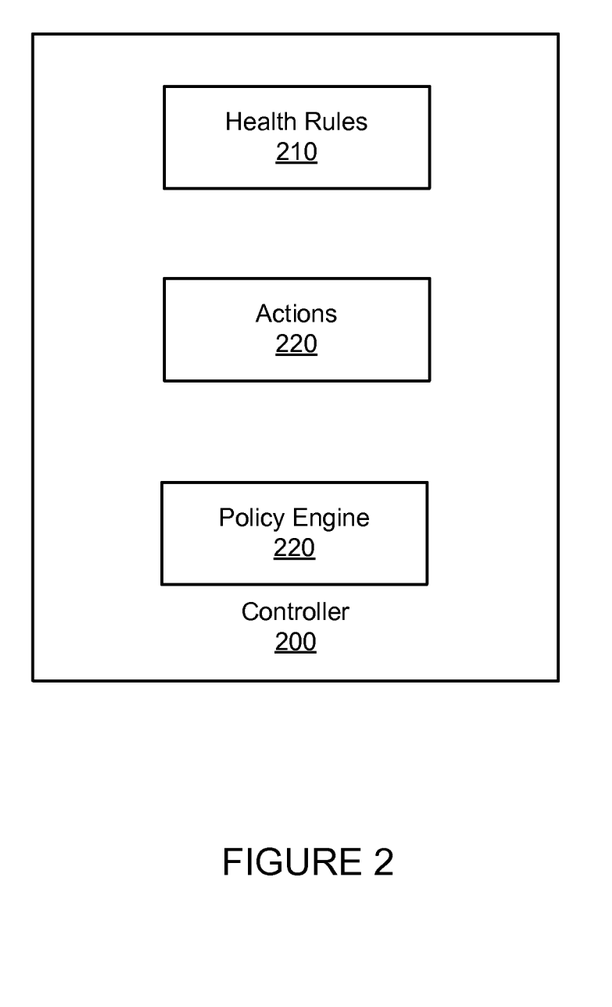
FIG. 2 is a block diagram of a controller.

Controller 190 may receive data from each of agents 134-154, may detect nodes that are not performing as desired, and may initiate actions on one or more of the nodes. FIG. 2 is a block diagram of a controller. Controller 200 may be used to implement controller 190 of the block diagram of FIG. 1. Controller 200 may include health rules 210, actions 220, and policy engine 220. Health rules 210 may include one or more rules which specify an expression involving performance data. Performance data may include a metric, error, or other value or trend detected, calculated or generated from monitoring the system of FIG. 1. The expression may relate to one or more business applications, a method, a cluster, a node, a resource, or some other entity. Examples of an expression may include "response time greater than one second", "CPU usage greater than 80%", "processing time greater than a fourth standard deviation", or "error rate greater than a third standard deviation." Controller 190 may install an agent into one or more virtual machines and/or application servers 130. Controller 190 may receive correlation configuration data, such as an object, a method, or class identifier, from a user through client device 192.

Actions 220 may be applied to a resource (such as a node) per a decision by policy engine 220. The actions may be performed by a machine agent or software agent. The actions may create additional instances of virtual machines, restart a machine, execute a string of commands via script code, and perform other operations. Additional examples of actions include configuring a new or restarted virtual machine, installing an agent in a virtual machine, applying a configuration to a virtual machine or application, restarting an application, and other actions.

Policy engine 220 determines what action should be applied to an application or node based on the health rule violation detected. A policy engine 220 may detect that a health rule is violated by a first node and select a particular action to apply to a second node. Policy engine 220 may retrieve a list of health rule violations, the health rule violator, and corresponding action from a table of corresponding health rules and actions. In this case, health rules 210 and actions 220 may be stored and correlated together in a table at controller 200.

Figure 3:
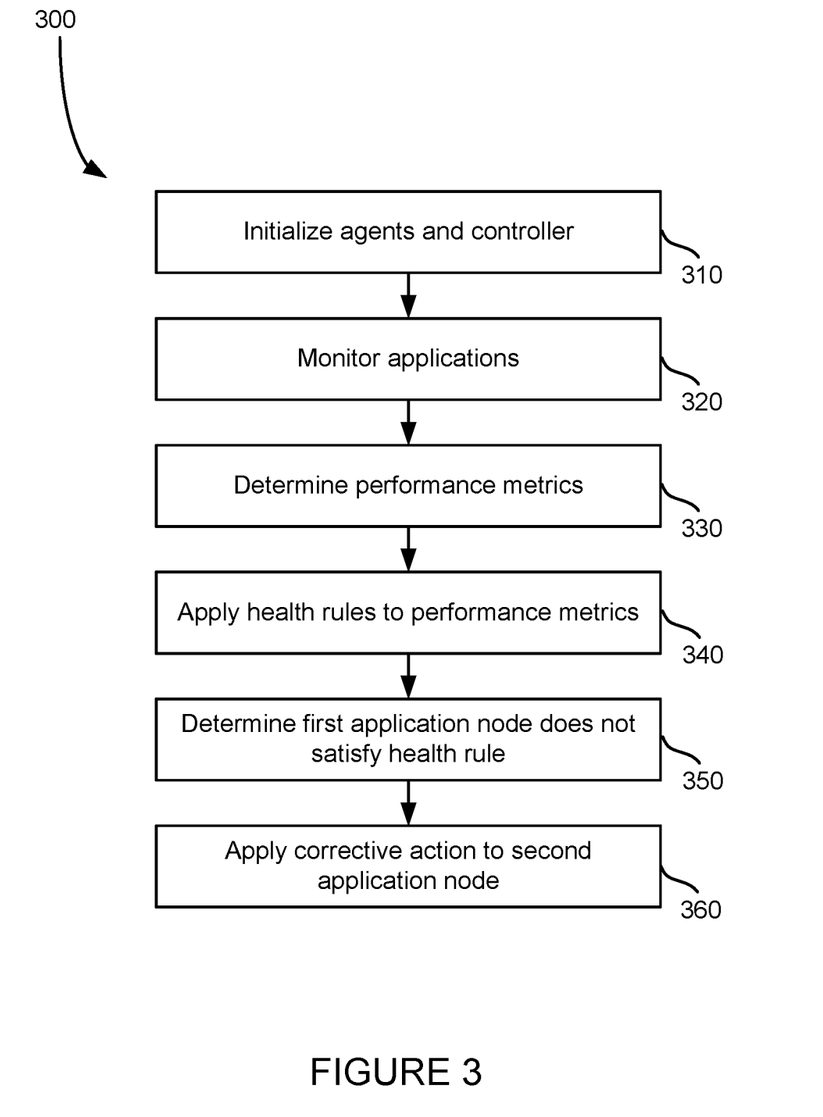
FIG. 3 is an exemplary flowchart for managing application performance.

FIG. 3 is an exemplary flowchart for managing application performance. First, agents and a controller are initialized at step 310. Initializing the agents and controller may include installing agents on nodes of a distributed system, installing agents in clients via embedding them in HTML code downloaded into web browser applications, instrumenting code and/or adding code in an application or other program by the agents, and other configurations to the agents and controller. Applications may be monitored at step 320. The applications may be monitored by one or more agents located at or in communication with the applications or programs. The agents may collect data, aggregate the data, process data, perform processing, and send data to a controller. The agents may also send raw data without aggregating the data to controller 190. More information for monitoring an application is disclosed in U.S. patent application Ser. No. 12/878,919, titled "Monitoring Distributed Web Application Transactions," filed on Sep. 9, 2010, U.S. patent application Ser. No. 13/189,360, titled "Automatic Capture of Diagnostic Data Based on Transaction Behavior Learning," filed on Jul. 22, 2011, and U.S. patent application Ser. No. 13/365,171, titled "Automatic Capture of Detailed Analysis Information for Web Application Outliers with Very Low Overhead," filed on Feb. 2, 2012, the disclosures of which are incorporated herein by reference.

Performance data, including metrics and error identification, may be determined at step 330. The performance data values may include response time, CPU usage, memory usage, error rates and other error information, and other values detected, generated or created from monitoring the system of FIG. 1. The performance data values may include, for example, any measure of performance or usage by node software or hardware on which the node software executes, as well as a combination of software applications and hardware applications. The performance data values may be determined from data collected and aggregated by agents 112, 119, and 134-164 of the system of FIG. 1 and reported to controller 190.

Health rules may then be applied to the performance data for multiple nodes at step 340. The health rules may be applied to node performance data by health rule module 210 of controller 200. Applying the health rules to the performance data may determine if a performance data value, or trend of values, satisfies a threshold or other expression indicated in the health rule. A determination may then be made as to whether a first node being monitored does not satisfy a health rule at step 350. In some cases, a node, such as a server, may not satisfy a particular health rule. For example, a first node may violate a CPU usage limit of 60% by using CPU usage at 70%.

A corrective action may be applied to a second node based on the health rule violation for the first node at step 360. The true source of a delay or failure at a first node may be present at a second node. For example, a request by a first node that takes a long time to complete may be due to lack of resources at a second node which receives the request. The second node may be selected based on stored data in association with the first node and the particular failure or metric. Applying corrective action to a second node based on a detection at a first node is discussed in more detail below with respect to the method of FIG. 4.

Figure 4:
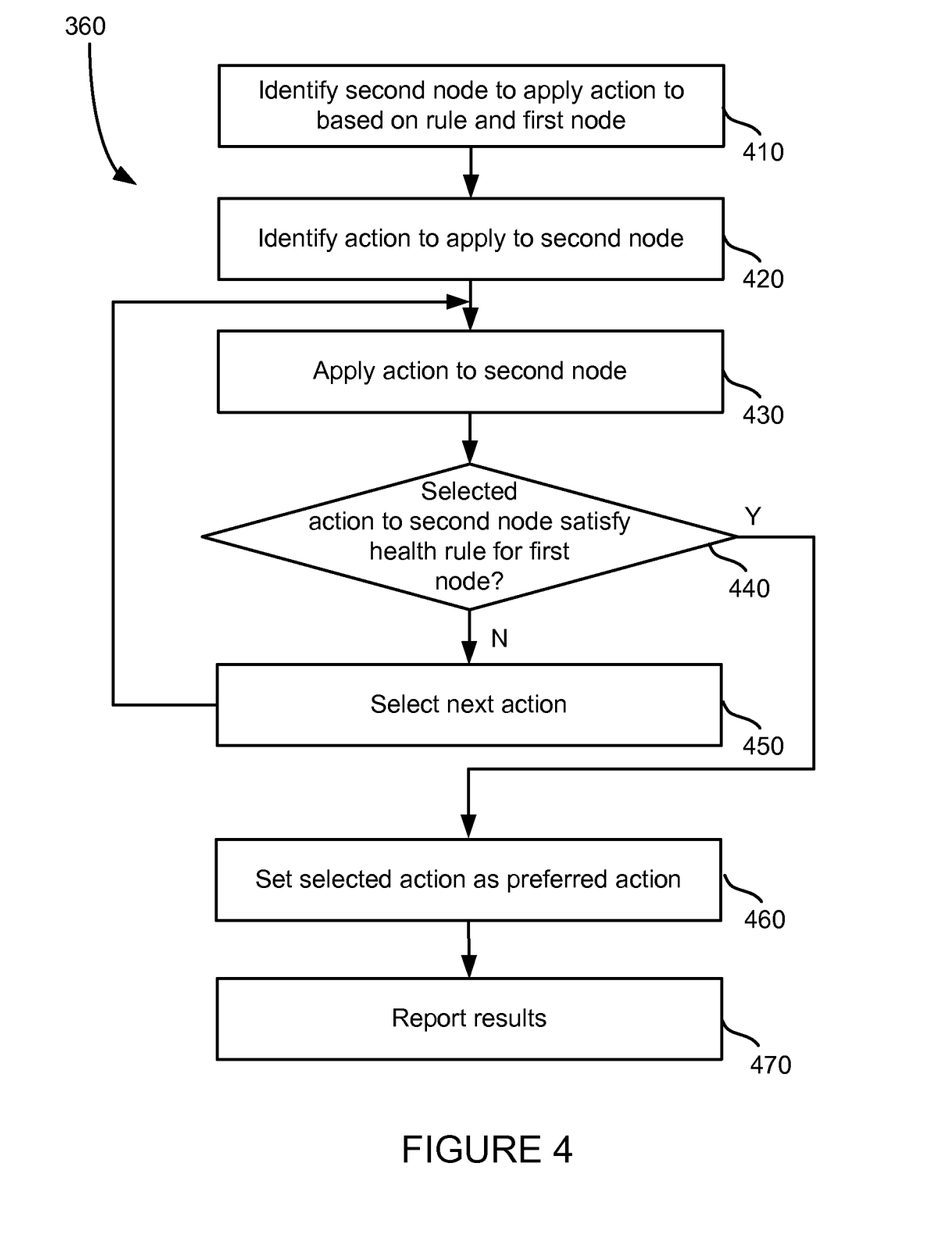
FIG. 4 is an exemplary flowchart for applying a corrective actions to a node.

FIG. 4 is an exemplary flowchart for applying corrective actions to a node. The method of FIG. 4 provides more detail for step 360 in the method of FIG. 3. First, a second node at which to apply an action based on the rule and first node at step 410. The selected node may process the same distributed transaction as the first node. The second node, in some instances, may process a request sent from the first node to the second node or one or more intervening nodes between the first node and second node. The second nodes may be chosen randomly, at least in part on one or more parameters, as well as based on other techniques. The parameters may include a geo location of the device which violated the health rule, a history of the machine which violated the health rule, a date and time of the violation, a platform of the machine which violated the health rule, and other parameters. In some instances, the second node is selected based on a rule and the type of metric for which the health rule was violated.

An action is selected to apply to the selected application node at step 420. The action may be selected by policy engine 220. The policy engine may be configured to apply a particular action for a particular health rule violation. Different levels of violations may correspond to different actions. In some embodiments, the selected action may be a first action from a list of several actions. The actions may be presorted based on the probability they have of succeeding.

Next, the selected action is applied to the selected application node at step 430. The action may be implemented by script code, via an instruction to an agent, or in some other manner.

A determination is made as to whether the selected action applied to the second node satisfies the health rule for the first node at step 440. Once the action is applied to the second node, the first node may be monitored to see if an improvement can be detected. In some embodiments, the selected node performance need not completely satisfy the health node, but may still be reported if an improvement in performance is observed in view of the previous performance of the node. If the selected application does not satisfy the health node (or does not improve performance), a determination is made as to whether there are more actions to apply to the second node at step 450. For example, there may be additional actions in a list of actions to apply to the second node in view of the particular health rule violation of the first node. If there are more actions to apply, the next action is selected at step 460 and the method of FIG. 4 returns to step 430.

If the selected application does satisfy the health rule, the selected action may set as the first action in a list of actions to be applied for future health rule violations of similar type at step 480. The results are then reported to an administrator or otherwise, as configured by a user or administrator, at step 490.

Figure 5:
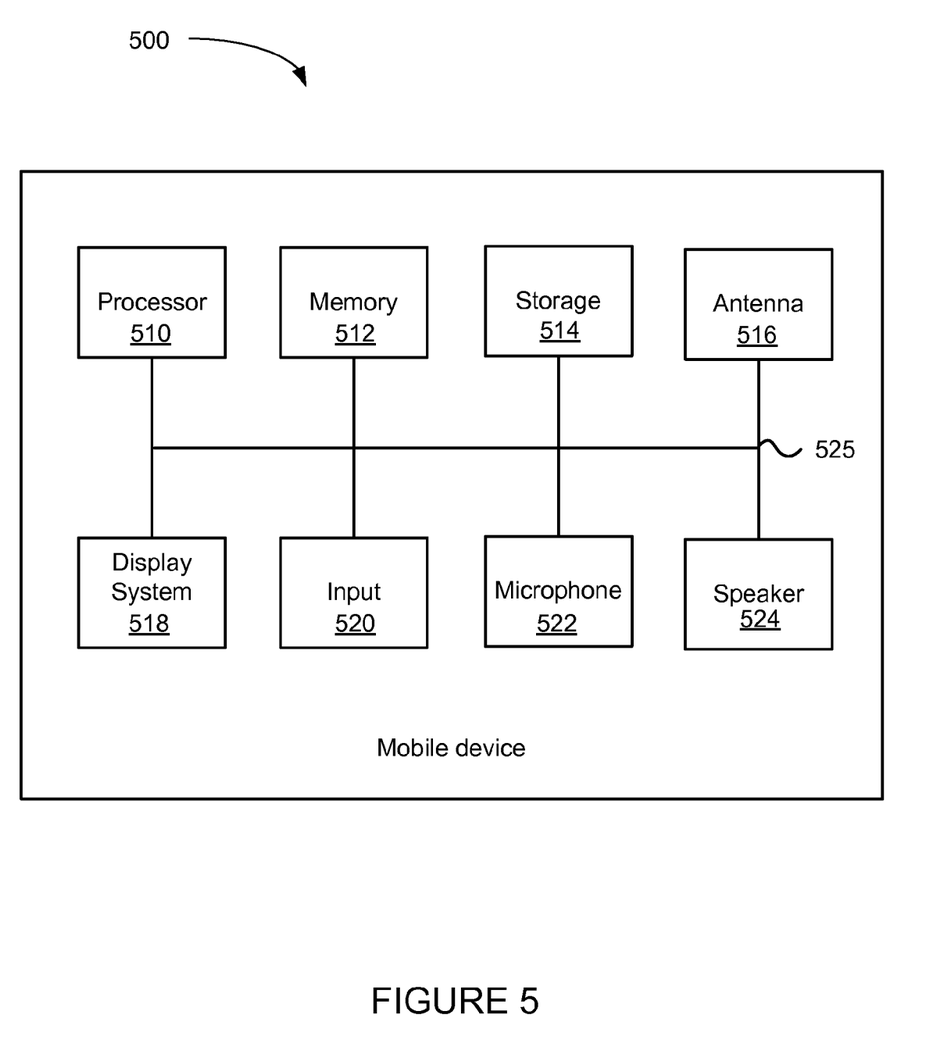
FIG. 5 is a block diagram of a computer system for implementing the present technology.

FIG. 5 is a block diagram of a computer system for implementing the present technology. System 500 of FIG. 5 may be implemented in the contexts of the likes of clients 105 and 192, network server 125, application servers 130-160, and data stores 190-185. A system similar to that in FIG. 5 may be used to implement mobile device 115, but may include additional components such as an antenna, additional microphones, and other components typically found in mobile devices such as a smart phone or tablet computer.

The computing system 500 of FIG. 5 includes one or more processors 510 and memory 510. Main memory 510 stores, in part, instructions and data for execution by processor 510. Main memory 510 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 510 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 510.

Portable storage device 540 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Figure 6:
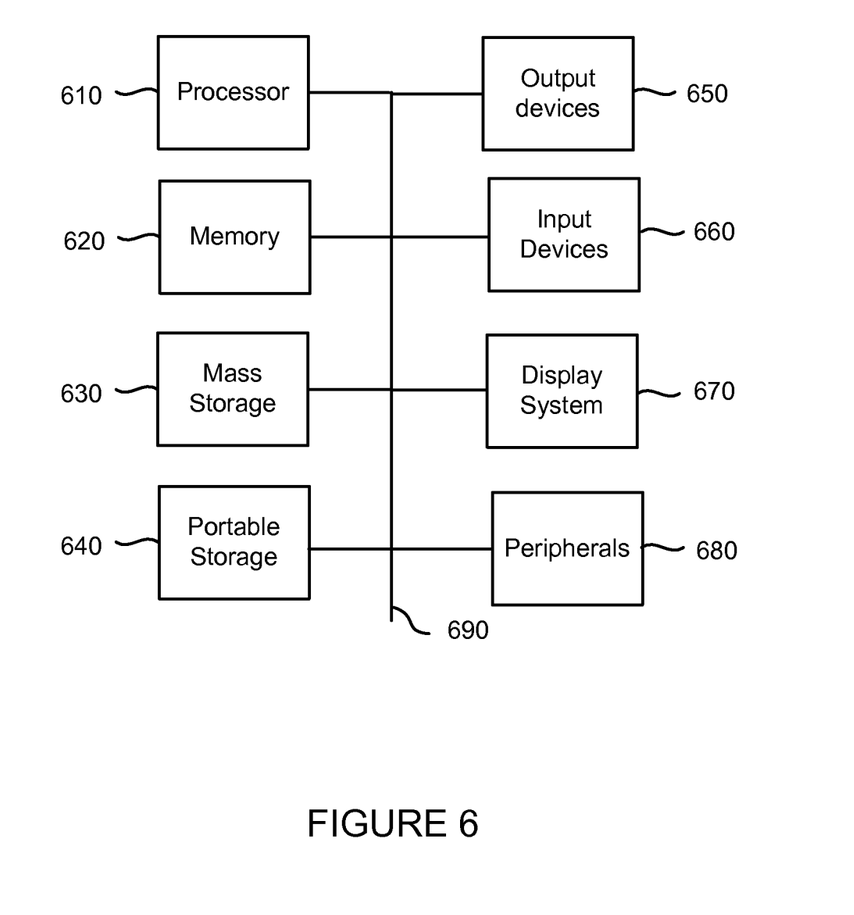
FIG. 6 is a block diagram of an exemplary mobile device for implementing the present technology.

FIG. 6 is a block diagram of an exemplary mobile device for implementing the present technology. The system of FIG. 6 may be used to implement mobile device 115. Mobile device 600 of FIG. 6 includes one or more processors 610 and memory 612. Memory 612 stores, in part, programs, instructions and data for execution and processing by processor 610. The system 600 of FIG. 6 further includes storage 614, one or more antennas 616, a display system 618, inputs 620, one or more microphones 622, and one or more speakers 624.

The components shown in FIG. 6 are depicted as being connected via a single bus 626. However, the components 610-624 may be connected through one or more data transport means. For example, processor unit 610 and main memory 612 may be connected via a local microprocessor bus, and storage 614, display system 618, input 620, and microphone 622 and speaker 624 may be connected via one or more input/output (I/O) buses.

Memory 612 may include local memory such as RAM and ROM, portable memory in the form of an insertable memory card or other attachment (e.g., via universal serial bus), a magnetic disk drive or an optical disk drive, a form of FLASH or PROM memory, or other electronic storage medium. Memory 612 can store the system software for implementing embodiments of the present invention for purposes of loading that software into main memory 610.

Antenna 616 may include one or more antennas for communicating wirelessly with another device. Antenna 616 may be used, for example, to communicate wirelessly via Wi-Fi, Bluetooth, with a cellular network, or with other wireless protocols and systems. The one or more antennas may be controlled by a processor 610, which may include a controller, to transmit and receive wireless signals. For example, processor 610 execute programs stored in memory 612 to control antenna 616 transmit a wireless signal to a cellular network and receive a wireless signal from a cellular network.

Display system 618 may include a liquid crystal display (LCD), a touch screen display, or other suitable display device. Display system 618 may be controlled to display textual and graphical information and output to text and graphics through a display device. When implemented with a touch screen display, the display system may receive input and transmit the input to processor 610 and memory 612.

Input devices 620 provide a portion of a user interface. Input devices 620 may include an alpha-numeric keypad, such as a keyboard, for inputting alpha-numeric and other information, a touch-screen, microphone, camera, buttons or switches, a trackball, stylus, or cursor direction keys.

Microphone 622 may include one or more microphone devices which transmit captured acoustic signals to processor 610 and memory 612. The acoustic signals may be processed to transmit over a network via antenna 616.

Speaker 624 may provide an audio output for mobile device 600. For example, a signal received at antenna 616 may be processed by a program stored in memory 612 and executed by processor 610. The output of the executed program may be provided to speaker 624 which provides audio. Additionally, processor 610 may generate an audio signal, for example an audible alert, and output the audible alert through speaker 624.

The mobile device system 600 as shown in FIG. 6 may include devices and components in addition to those illustrated in FIG. 6. For example, mobile device system 600 may include an additional network interface such as a universal serial bus (USB) port.

The components contained in the computer system 600 of FIG. 6 are those typically found in mobile device systems that may be suitable for use with embodiments of the present invention and are intended to represent a broad category of such mobile device components that are well known in the art. Thus, the computer system 600 of FIG. 6 can be a cellular phone, smart phone, hand held computing device, minicomputer, or any other computing device. The mobile device can also include different bus configurations, networked platforms, multi-processor platforms, etc. Various operating systems can be used including Unix, Linux, Windows, Macintosh OS, Google OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for monitoring a distributed business transaction over a distributed system of nodes, the method comprising:
   receiving, by a controller on a server, performance data associated with the nodes that process a distributed business transaction, the performance data received from the agents installed at the nodes;
   detecting, by the controller, a performance issue with one of the nodes based on the received performance data;
   selecting one or more of the nodes other than the node associated with the detected performance issue, the one or more of the other nodes associated with a cause of the detected performance issue and the selecting being based on a parameter associated with the node associated with the detected performance issue; and
   applying a corrective action to the selected one or more of the nodes other than the node associated with the detected performance issue to address the cause of the detected performance issue; and
   monitoring the node associated with the detected performance issue to determine whether subsequent performance data received for the node associated with the detected performance issue improve after the corrective action is applied to the selected one or more of the nodes other than the node associated with the detected performance issue.

2. The method of claim 1, wherein detecting the performance issue includes comparing the received performance data against one or more health rules.

3. The method of claim 2, including determining the corrective action to apply based on a violation of the one or more of the health rules.

4. The method of claim 1, wherein the corrective action is applied to the one or more of the nodes other than the node associated with the detected performance issue to address a performance issue associated with a request initiated by the node associated with the detected performance issue, wherein the performance issue associated with the request is caused by a lack of resources at the one or more of the nodes other than the node associated with the detected performance issue.

5. The method of claim 1, including:
   determining a metric for the node associated with the detected performance issue.

6. The method of claim 1, including instructing the agent or agents installed on the selected one or more nodes other than the node associated with the detected performance issue to apply the corrective action.

7. The method of claim 1, wherein the corrective action includes creating additional instances of virtual machines, restarting a machine, executing a string of commands via script code, configuring a new or restarted virtual machine, installing an agent in a virtual machine, applying a configuration to a virtual machine or application, or restarting an application.

8. The method of claim 1, including:
determining based on the monitoring that the corrective action applied to the selected one or more of the nodes other than the node associated with the detected performance issue does not result in the detected performance issue being corrected; and
applying another corrective action to the selected one or more of the nodes other than the node associated with the detected performance issue.

9. The method of claim 1, including:
selecting the corrective action from a list of available action sorted based on a probability of addressing the detected performance issue.

10. The method of claim 1, wherein each node includes one or more application servers.

11. A non-transitory computer readable storage medium having embodied thereon a program, the program being executable by a processor to perform operations for monitoring a distributed business transaction, the operations including:
receiving, by a controller on a server, performance data associated with the nodes that process a distributed business transaction, the performance data received from the agents installed at the nodes;
detecting, by the controller, a performance issue with one of the nodes based on the received performance data;
selecting one or more of the nodes other than the node associated with the detected performance issue, the one or more of the other nodes associated with a cause of the detected performance issue and the selecting being based on a parameter associated with the node associated with the detected performance issue; and
applying a corrective action to the selected one or more of the nodes other than the node associated with the detected performance issue to address the cause of the detected performance issue; and
monitoring the node associated with the detected performance issue to determine whether subsequent performance data received for the node associated with the detected performance issue improve after the corrective action is applied to the selected one or more of the nodes other than the node associated with the detected performance issue.

12. The non-transitory computer readable storage medium of claim 11, wherein detecting the performance issue includes comparing the received performance data against one or more health rules.

13. The non-transitory computer readable storage medium of claim 12, the operations including determining the corrective action to apply based on a violation of the one or more of the health rules.

14. The non-transitory computer readable storage medium of claim 11, wherein the corrective action is applied to the one or more of the nodes other than the node associated with the detected performance issue to address a performance issue associated with a request initiated by the node associated with the detected performance issue, wherein the performance issue associated with the request is caused by a lack of resources at the one or more of the nodes other than the node associated with the detected performance issue.

15. The non-transitory computer readable storage medium of claim 11, the operations including:
determining a metric for the node associated with the detected performance issue.

16. The non-transitory computer readable storage medium of claim 11, the operations including instructing the agent or agents installed on the selected one or more nodes other than the node associated with the detected performance issue to apply the corrective action.

17. The non-transitory computer readable storage medium of claim 11, wherein the corrective action includes creating additional instances of virtual machines, restarting a machine, executing a string of commands via script code, configuring a new or restarted virtual machine, installing an agent in a virtual machine, applying a configuration to a virtual machine or application, or restarting an application.

18. The non-transitory computer readable storage medium of claim 11, the operations including:
determining based on the monitoring that the corrective action applied to the selected one or more of the nodes other than the node associated with the detected performance issue does not result in the detected performance issue being corrected; and
applying another corrective action to the selected one or more of the nodes other than the node associated with the detected performance issue.

19. The non-transitory computer readable storage medium of claim 11, the operations including:
selecting the corrective action from a list of available action sorted based on a probability of addressing the detected performance issue.

20. The non-transitory computer readable storage medium of claim 11, wherein each node includes one or more application servers.

21. A system for monitoring a business transaction, comprising:
a processor;
a memory; and
one or more modules stored in memory and executable by a processor to perform operations including:
receiving, by a controller on a server, performance data associated with the nodes that process a distributed business transaction, the performance data received from the agents installed at the nodes;
detect, by the controller, a performance issue with one of the nodes based on the received performance data;
selecting one or more of the nodes other than the node associated with the detected performance issue, the one or more of the other nodes associated with a cause of the detected performance issue and the selected one or more nodes being based on a parameter associated with the node associated with the detected performance issue; and
apply a corrective action to the selected one or more of the nodes other than the node associated with the detected performance issue to address the cause of the detected performance issue; and
monitor the node associated with the detected performance issue to determine whether subsequent performance data received for the node associated with the detected performance issue improve after the corrective action is applied to the selected one or more of the nodes other than the node associated with the detected performance issue.

22. The system of claim 21, wherein the operations to detect the performance issue includes operations to compare the received performance data against one or more health rules.

23. The system of claim 22, the operations include determine the corrective action to apply based on a violation of the one or more of the health rules.

24. The system of claim 21, wherein the corrective action is applied to the one or more of the nodes other than the node associated with the detected performance issue to address a performance issue associated with a request initiated by the node associated with the detected performance issue, wherein the performance issue associated with the request is caused by a lack of resources at the one or more of the nodes other than the node associated with the detected performance issue.

25. The system of claim 21, the operations include:
determine a metric for the node associated with the detected performance issue.

26. The system of claim 21, the operations include instruct the agent or agents installed on the selected one or more nodes other than the node associated with the detected performance issue to apply the corrective action.

27. The system of claim 21, wherein the corrective action includes create additional instances of virtual machines, restart a machine, execute a string of commands via script code, configure a new or restarted virtual machine, install an agent in a virtual machine, apply a configuration to a virtual machine or application, or restart an application.

28. The system of claim 21, the operations include:
determine based on the monitoring that the corrective action applied to the selected one or more of the nodes other than the node associated with the detected performance issue does not result in the detected performance issue being corrected; and
apply another corrective action to the selected one or more of the nodes other than the node associated with the detected performance issue.

29. The system of claim 21, the operations including:
select the corrective action from a list of available action sorted based on a probability of addressing the detected performance issue.

30. The system of claim 21, wherein each node includes one or more application servers.

* * * * *